WATER CONDITIONING SYSTEM
Original Filed Nov. 20, 1963 3 Sheets-Sheet 1
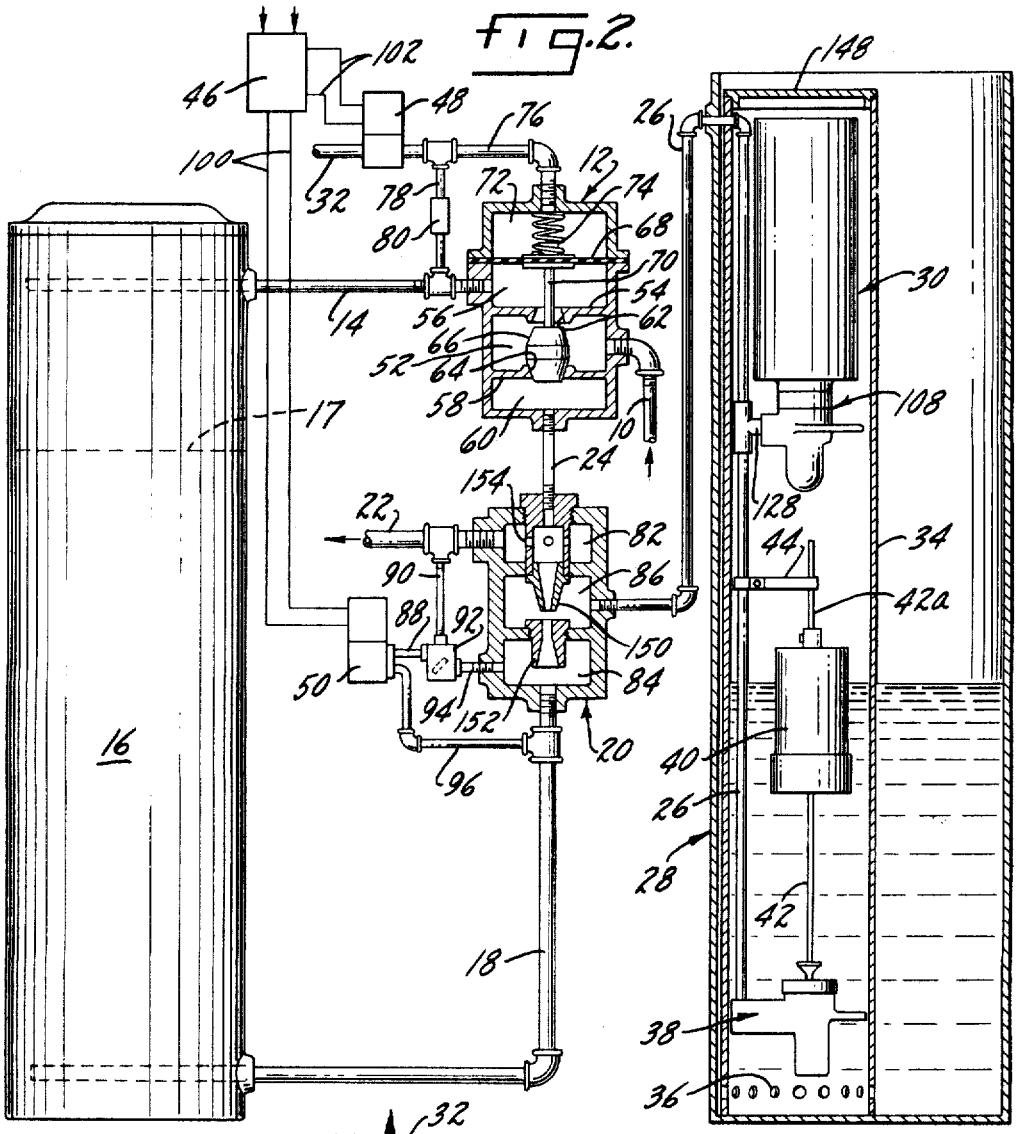
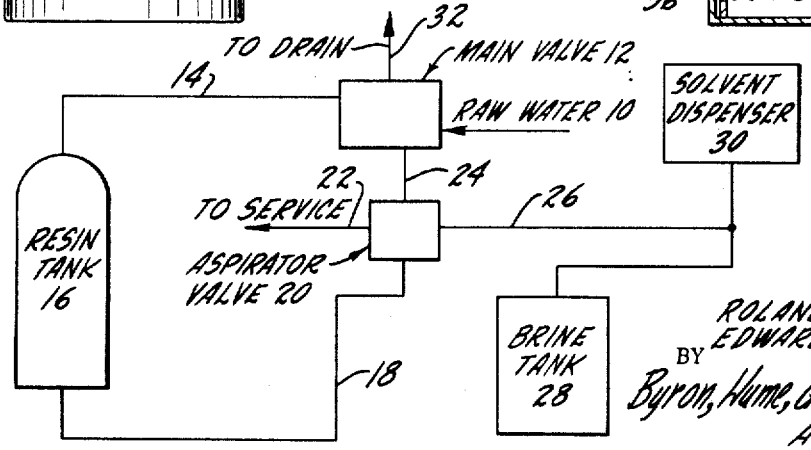
fig. 1.
INVENTORS.
ROLAND R. REID
EDWARD G. GRESSMAN
BY
Byron, Hume, Groen & Clement
Attorneys.

WATER CONDITIONING SYSTEM

Original Filed Nov. 20, 1963 3 Sheets-Sheet 3

INVENTORS.
ROLAND R. REID
EDWARD G. GRESSMAN
BY
Byron, Hume, Groen & Clement
Attorneys.

WATER CONDITIONING SYSTEM

Original Filed Nov. 20, 1963 3 Sheets-Sheet 3

INVENTORS.
ROLAND R. REID
EDWARD G. GRESSMAN
BY
Byron, Hume, Green & Clement
Attorneys.

United States Patent Office

Re. 26,343
Reissued Feb. 13, 1968

26,343

WATER CONDITIONING SYSTEM

Roland R. Reid, Brooklyn Park, and Edward G. Gressman, St. Paul, Minn., assignors to Union Tank Car Company, Chicago, Ill., a corporation of New Jersey Original No. 3,255,106, dated June 7, 1966, Ser. No. 325,122, Nov. 20, 1963. Application for reissue Apr. 27, 1967, Ser. No. 646,742

22 Claims. (Cl. 210—32)

Matter enclosed in heavy brackets [ ] appears in the original patent but forms no part of this reissue specification; matter printed in italics indicates the additions made by reissue.

*ABSTRACT OF THE DISCLOSURE*

*A water softening system using brine and iron contaminant solvent to regenerate ion exchange resin. A softening tank containing the resin is connected through an aspirator and valveless piping to the brine and solvent. The solvent is stored at a higher level than the brine so that the solvent passes through the resin before the brine.*

This application is a continuation-in-part of Serial No. 170,043, filed January 31, 1962, now abandoned.

This invention relates to a water conditioning system and, more particularly, to a water softening system and a method and apparatus for regenerating ion exchange resin particles employed in such a system.

Water softening with ion exchange resin particles is well known in the art. After prolonged contact of the ion exchange resin particles with raw water during the service cycle these resin particles become "exhausted," i.e., their ability to exchange soft ions for the hard ions in the raw water is substantially diminished. When the ion exchange resin particles become exhausted, they must be regenerated. Heretofore, regeneration has been effected by contacting the resin particles with a brine solution, e.g., an aqueous solution of sodium chloride, potassium chloride or the like. However, this has not been particularly successful where the water being softened contains dissolved and/or undissolved iron impurities. Such impurities adhere to the resin particles, thereby impairing the ion exchange capacity of the resin particles, and are substantially unaffected by the brine solution. Accordingly, the resin particles when used to soften iron-containing water progressively lose their ion exchange capacity despite periodic regeneration with brine solution.

In an effort to prevent this progressive loss of ion exchange capacity the resin particles have been regenerated with aqueous mixtures of salt and a water-soluble iron contaminant solvent. Such a process is taught by United States Patents Nos. 2,769,787 and 3,073,674. This technique has not however been satisfactory, because the mixed solution does not retain its regeneration capacity and, furthermore, will leave the bed in a hydrogen form when using an acid iron removal material thereby increasing the acidity of the treated water.

Accordingly, it is an object of the present invention to provide a water softener system adapted to soften iron-containing water.

It is another object of the present invention to provide a method and apparatus for regenerating ion exchange resin particles which have been contacted with iron-containing water.

It is a further object of the present invention to provide in a water softening system apparatus for regenerating ion exchange resin particles which have been contacted with iron-containing water.

The invention, both as to its organization and method of operation, taken with further objects and advantages thereof, will be understood by reference to the following description taken in conjunction with the accompanying drawings, in which:

FIGURE 1 is a schematic diagram of a water softening system in accordance with the present invention wherein iron-containing water is treated with ion exchange resin particles which are regenerated by an ion contaminant solvent and a brine solution;

FIGURE 2 is a more detailed view of the water softening system of FIGURE 1, some of the components of the system being illustrated schematically and other components being shown in cross-section;

Figure 3:
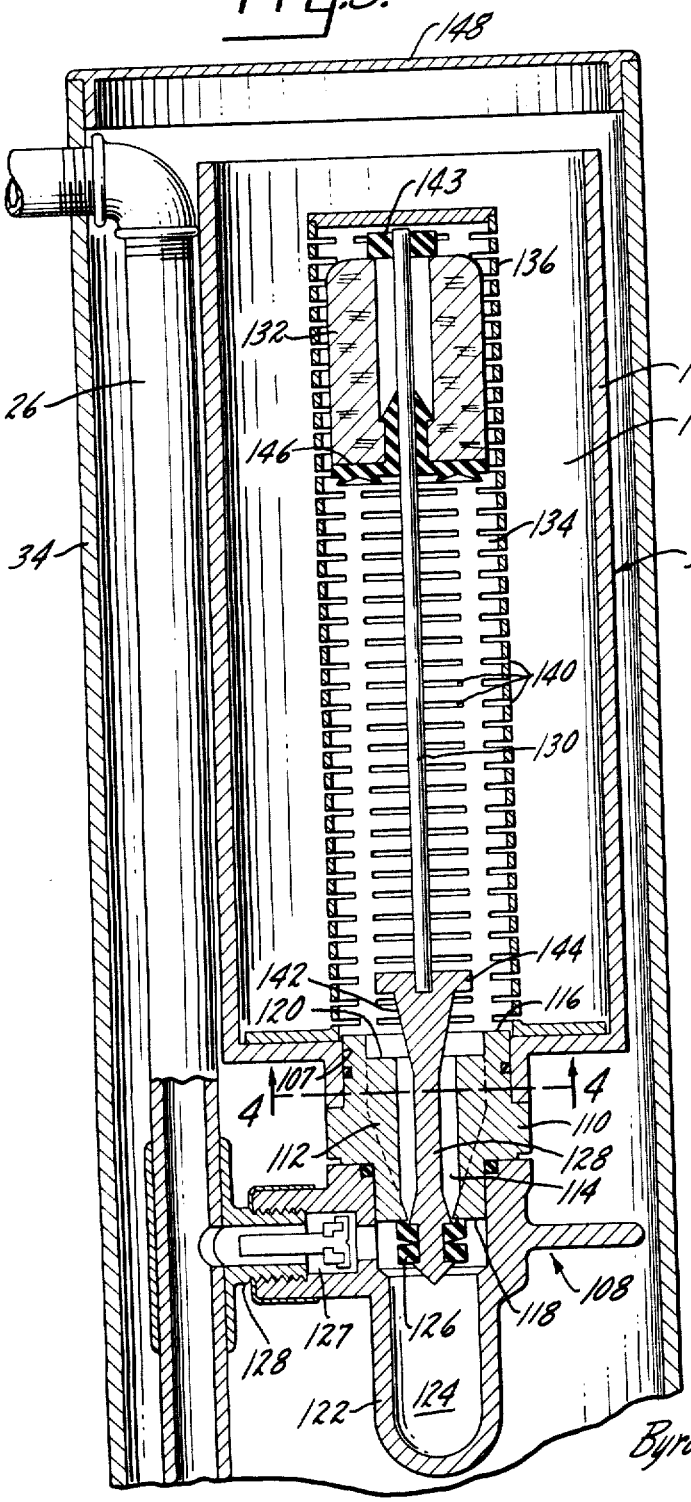
FIGURE 3 is an enlarged sectional view of the solvent dispenser in the water softening system of FIGURE 1, the solvent dispenser metering a pre-determined quantity of an iron contaminant solution to the resin tank during the regeneration cycle.

Referring to the drawings, and more particularly to FIGURE 1, there is schematically illustrated a water softening system for treating iron-containing water with ion exchange resin particles in accordance with the present invention. Ion exchange resin particles heretofore employed to soften iron-containing water may be employed, though it is preferred to employ strong-acid resin particles of the styrene-divinyl-benzene type. In this system, in accordance with the present invention, the ion exchange resin particles, when they become exhausted, are regenerated sequentially with an iron contaminant solution and a brine solution.

During the service cycle, raw iron-containing water from a suitable source is passed through a feed line 10 to a main valve, indicated generally by reference numeral 12, which will be described in detail hereinafter. The main valve 12 directs the raw water through a line 14 to a resin tank 16 which contains a bed of the ion exchange resin particles. The raw water passes through the bed of ion exchange resin particles and is withdrawn from the tank 16 through a line 18. The treated water, which has been softened by contact with the ion exchange resin particles, passes through the line 18 to an aspirator valve 20 which diverts it to a service line 22. There is, of course, no mixing of the treated water and the raw water, though the aspirator valve 20 and the main valve 12 are connected by a line 24.

After a predetermined quantity of raw water has passed through the resin tank 16, the ion exchange resin particles lose their capacity to effectively soften the raw water and must be regenerated. In accordance with the present invention regeneration is effected by sequentially contacting the exhausted resin particles with an iron contaminant solvent and a brine solution. The regeneration cycle is initiated by actuating the main valve 12 in a manner more apparent hereinafter, so that the raw water from the line 10 is directed through the line 24 into the aspirator valve 20. A portion of this raw water passes to the service line 22 thereby maintaining a supply of water to the service line 22 during the regeneration cycle. The remainder of the raw water passes through the aspirator valve 20 in the line 18. As the raw water passes through the aspirator valve 20 to the line 18 a partial vaccum, i.e., a pressure less than atmospheric pressure, is created therein and in a line 26 which communicates with the aspirator valve 20, a brine tank 28 and a solvent dispenser 30. By virtue of the partial vacuum created in the line 26, a predetermined amount of iron contaminant solvent is drawn from the solvent dispenser 30 and a predetermined amount of brine solution is drawn from the brine tank 28. The solvent and brine solution pass sequentially through the line 26 into the aspirator valve 20 and through the line 18 into the tank 16. Contaminant solvent and brine solution are precluded from mixing with the raw water which passes to the service line 22 from the aspirator valve 20, as will be more apparent hereinafter. After passing upwardly through the bed of resin particles in the tank 16, and thereby regenerating the resin particles, the contaminant solvent and brine solution are passed to drain through a line 32 after passing through the line 14.

When the regeneration of the resin particles in the tank 16 is complete, the regeneration cycle is terminated by actuating the main valve 12 so that the raw water passes through the line 14, the tank 16, the line 18, the aspirator valve 20, and the service line 22, as discussed hereinbefore. During the service cycle some of the treated water passes under relatively high pressure from the aspirator valve 20 to the line 26 to supply make-up water to the solvent dispenser 30 and the brine tank 28 and thereby prepare additional contaminant solvent and brine solution, respectively, for the next regeneration cycle.

Figure 4:
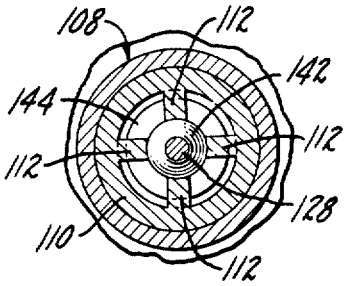
FIGURE 4 is a cross-sectional view of the solvent dispenser taken along line 4—4 of FIGURE 3.

Referring to FIGURES 2–4, which illustrate in greater detail the system shown in FIGURE 1, the water softening system embodying the features of the present invention will be further described. The water softening system includes the resin tank 16, control means, the brine tank 28 and the solvent dispenser 30. The resin tank 16 contains a bed 17 of the ion exchange resin particles through which the raw iron-containing water is passed to remove the hardness, impurities, iron impurities and other impurities as is well known in the art.

The control means is essentially the same as the control means illustrated and described in Kryzer Patent No. 2,999,514, issued on September 12, 1961, and includes an electric timer 46, the main valve 12, the aspirator valve 20, and electro-responsive valves 48 and 50, the latter being adapted to be energized at selected times by the timer 46. The main valve 12 has an inlet chamber 52 which is connected to the raw water fed line 10. The inlet chamber 52 is separated by a partition 54 from a first outlet chamber 56 and is separated by a partition 58 from a second outlet chamber 60, ports 62 and 64 being formed in the partitions 54 and 58, respectively, for the passage of liquid from the inlet chamber 52 selectively to the chambers 56 and 60. The chambers 56 communicates with the upper portion of the resin tank 16 through the line 14, while the chamber 60 communicates with the aspirator valve 20 through the line 24.

A valve closure member 66 having a circular cross-section is movable alternately from a position in which it closes the port 64 in the partition 58 to a position in which it closes the port 62 in the partition 54. Movement of the valve closure member 66 to and from each of its closed positions is under the control of a fluid pressure responsive diaphragm 68, made of rubber or other suitable flexible material. When the valve closure member 66 closes the port 64 in the partition 58, the port 62 in the partition 54 is open and vice versa. The valve closure member 66 is attached to an axially disposed stem 70 which has its other end connected to the diaphragm 68. The lower side of the diaphragm 68 is subject to the pressure in the chamber 56 while the upper side of the diaphragm 68 is subject to the pressure in a chamber 72 in the main valve 12. A spring 74 is disposed in the chamber 72 to bias the diaphragm 68 and valve closure member 66 toward a position in which the port 64 in the partition 58 is closed and the port 62 in the partition 54 is open.

Raw water is supplied to the chamber 52 through the line 10 and flows through the port 62, the chamber 56 and the line 14 to the upper portion of the tank 16. A conduit 76 connects the chamber 72 to the inlet of the valve 48. A branch line 78 interconnects the line 14 and the conduit 76. The drain pipe 32 is connected to the outlet of the valve 48. Interposed in the branch conduit 78 is a flow control valve 80 for restricting the flow to the conduit 76 and the drain line 32.

The aspirator valve 20 is of the common type having an inlet chamber 82, an outlet chamber 84 and a suction or low pressure chamber 86. An injector nozzle 150 is mounted in the inlet chamber 82 and is connected to the line 24. The injector nozzle 150 has a plurality of lateral openings 154 to provide communication between the line 24 and the inlet chamber 82, the latter being in direct communication with the service line 22. The injector nozzle 150 has a nozzle opening at its end which opens into the suction chamber 86 and is aligned with a venturi tube 152. One end of the venturi tube 152 opens into the suction chamber 86 and the other end opens in the outlet chamber 84. The suction chamber 86 communicates with the line 26 which in turn communicates with the brine tank 28 and solvent dispenser 30. The outlet chamber 84 communicates with the line 18 which is connected to the bottom portion of the resin tank 16. As will be more apparent hereinafter, during the regeneration cycle raw water will pass through the line 24, the injector nozzle 150 and the venturi tube 152 into the outlet chamber 84 thereby creating a suction or partial vacuum in the chamber 86 whereby the contaminant solvent and brine solution are drawn through the line 26 and passed to the resin tank 16. During the regeneration cycle, a portion of the raw water from the line 24 passes through the openings 154 to the line 22 so that there is a continuous supply of water to the service line 22.

A valve 50 has its outlet connected by a conduit 88, a check valve 92 and a conduit 90 to the service line 22. Another by-pass conduit 94 connects the check valve 92 and the outlet chamber 84. The check valve 92 is a one-way valve which allows fluid to flow from the chamber 84 through the line 94 to the line 90 and the service line 22, but prevents fluid from flowing from lines 88 and/or 90 to the chamber 84. The check valve 92 does not impede or obstruct the flow of fluid from the line 88 to the conduit 90. The inlet of the valve 50 is connected to the line 18 by a by-pass conduit 96.

The valves 48 and 50 are in this instance solenoid actuated. As indicated schematically in FIGURE 2, the solenoid coil for the valve 50 may be included in a circuit with the timer 46 by conductors 100 and the solenoid coil for the valve 48 may be included in a circuit with the timer 46 by conductors 102. Accordingly the timer 46 controls the opening and closing of the valves 48 and 50. The valves 48 and 50 are well known in the art and it will be understood that other types of valves may be employed to perform the functions of the valves 48 and 50 without departing from the spirit and scope of the present invention.

The brine tank 28 is adapted to supply a brine solution, such as a sodium chloride solution or a potassium chloride solution, to the resin tank 16 during the regeneration cycle. The brine tank 28 contains a supply of solid salt (not shown), such as pelletized or granular sodium chloride, and also sodium chloride solution. A brine well 34 is mounted within the tank 28 to receive sodium chloride solution from the tank 28. To these ends, the well 34 has slots 36 in the lower portion thereof which provide continuous communication with the lower portion of the tank 28, the slots 36 being small enough, however, to prevent solid salt in the tank 28 from entering the well 34. Salt solution is withdrawn from the well 34 through the line 26 during the regeneration cycle and water is supplied to the well 34 through the line 26 during the service cycle, as will be more apparent hereinafter.

The flow of liquid between the line 26 and interior of the well 34 is under control of a float actuated valve indicated generally by reference numeral 38. An example of a suitable float actuated valve for use in the well 34 is described in the Techler Patent No. 2,904,062, granted September 15, 1959. As shown the valve 38 is operatively connected to a float body 40 by a rod 42 and the float body 40 is guided for vertical movement in the well 34 by a bracket 44 slidably engaging an extension 42a of the rod 42 which projects upwardly from the float body 40. The bracket 44 may be supported on the adjacent vertically extending portion of the line 26 within the well 34.

The valve 38, like that described in the above-identified Techler patent, is opened and closed in response to chamber 84 and the conduit 18 into the bottom of the resin tank 16 along with the flowing raw water.

Similarly, brine solution is drawn from the brine well 34 and the brine tank 28 until the level of the brine solution in the brine well 34 and the brine tank 28 has reached a level whereby the float body 40 closes the valve 38. Generally speaking, for purposes of comparison, the amount of contaminant solvent employed during each regeneration cycle is in the range of about 5 to 1000 ml., while the amount of brine solution utilized will be in the range of about 0.5 to 100 gals., depending upon the amount of resin particles, the amount and impurity of the water being treated, and the like. The valves 108 and 38 may be set to give any desired amount of solvent and brine solution, respectively. The brine solution drawn from the brine well 34 and the brine tank 28 passes through the line 26 to the resin tank 16 in the same manner that the contaminant solvent passed from the solvent dispenser 30 to the resin tank 16.

Because the solvent dispenser 30 is connected to the line 26 upstream of the point where the brined well 34 is connected to the line 26 (with respect to the regeneration cycle) and because only a relatively small amount of solvent is utilized, there will be little or no co-mingling of the brine solution with the solvent. Therefore, the contaminant solvent will pass ahead of the brine solution through the line 26, the aspirator valve 20, the line 18 and the resin tank 16. The contaminant solution and brine solution pass sequentially upwardly through the resin bed 17 in the resin tank 16 and regenerate the resin particles. They are withdrawn sequentially through the conduit 14 and pass through conduit 78, flow control valve 80, line 76 and valve 48 to the drain line 32. The regeneration cycle is terminated by the timer 46 automatically breaking the circuit and thereby closing the valve 48.

When the valve 48 closes the liquid pressure in the chamber 72 will build up until the combined action of the spring 74 with the liquid pressure in the chamber 72 causes the diaphragm 68 to move downwardly until the valve member 66 opens the port 62 and closes the port 64. The water softening system is now back to its service cycle. During the regeneration cycle the other portion of the raw water which passes to the aspirator valve 20 will flow through the openings 154 in the injector nozzle 150 and the chamber 82 into the service line 22. In this manner a continuous supply of water is maintained to the service line 22. Having returned to the service cycle, the raw water passes through the chamber 52, the port 62, the outlet chamber 56 and the line 14 into the top of the resin tank 16. As the raw water passes downwardly through the bed 17 of resin particles it is softened and iron impurities also removed. The treated water is withdrawn from the bottom of the tank 16 through the line 18 and passes into the outlet chamber 84 of the aspirator valve 20. A portion of the softened water passes through the conduit 94, the check valve 92 and the conduit 90 into the service line 22. Some of the softened water passes into the chamber 86 of the aspirator valve 20 from which it flows through the line 26 to supply make-up water to the solvent dispenser 30 and the brine tank 28.

With respect to replenishing the solvent dispenser 30, the softened water under pressure passes from the line 26 through the passageway 127 into the chamber 124. Since the valve stem 128 is in its lowered position, the softened water under pressure may pass through the passageway 114, unseat the float body 132 from the flange 144 and the valve seat 116, and flow into the float chamber 134 and solvent container 106. Water continues to enter the solvent container 106 in this manner until the float body 132, which rises with the level of the liquid in the solvent container 106, comes in contact with the stop member 143. When this occurs further upward movement of the float body 132 causes corresponding upward movement of the stop member 143 and the guide of narrow slots 140 formed in the wall thereof which permit free passage of liquid between the annular zone 138 and the float chamber 134, while preventing the solid iron contaminant removal material, in the annular zone 138 from passing to the float chamber 134. The slots 140 are suitably spaced throughout the length of the wall of the member 136.

The upper end portion of the valve stem 128 has an integral outwardly flaring head 142 and an annular flange 144. The flange 144 is adapted to be supported on valve seat 120 formed by the upper ends of the ribs 112 when the valve stem 128 is in its lower position. When the valve stem 128 is in its lower position, the annular flange 144 and the valve body member 110 form an annular port which permits liquid to flow from the float chamber 134 through the pasageway 114 and the chamber 124 to the line 26. In addition, the annular valve seat 116 is co-planar with the top of the annular flange 144 when the valve stem 128 is in its lowered position. As will be more apparent hereinafter, the float body 132 closes the annular port between the flange 144 and the valve body member 110 when substantially all of the solvent has been dispensed from the solvent container 106 during the regeneration cycle.

The float body 132 has an axial bore through which the guide rod 130 extends, the axial bore of the float body 132 being substantially larger than the diameter of the guide rod 130. An upper stop member 143 is attached by suitable means to the guide rod 130 above the float body 132. The stop member 143 is adjustably secured to the guide rod 130 so that it may be moved upwardly or downwardly on the guide rod 130 to any desired position. The position of the stop member 143 on the guide rod 130 determines the amount of contaminant solvent which will be dispensed during the regeneration cycle. The float body 132 moves upwardly as make-up water enters the float chamber 134 and solvent container 106 and contacts the stop member 143 thereby moving the valve stem 128 upwardly until the valve closure member 126 seats upon the valve seat 118 and prevents further flow of make-up water into the solvent dispenser 30.

Mounted on the bottom of the float body 132 is an annular valve closure member indicated generally by reference numeral 146. The valve closure member 146 is described in detail in the above-mentioned Techler et al. application and accordingly a detailed description thereof is not necessary for purposes of this application. It suffices to say that the valve closure member 146 is preferably molded from a suitable flexible elastic material, such as rubber or the like, and is adapted to close the annular port formed by the flange 144 and the valve body member 110 when the valve stem 128 is in its lower position. To these ends, the valve closure member 146 will seat upon the flange 144 and the annular seat 116 when substantially all of the liquid in the solvent container 106 has been dispensed to the line 26, i.e., when the float body 132 moves downwardly sufficiently so that the valve closure member 146 rests upon the flange 144 and the annular valve seat 116.

The solvent dispenser 30 is located within and at the top of the brine well 34. A removable cover 148 on the brine well 34 is provided to allow access to the interior of the solvent dispenser 30 so that additional iron contaminant removal particles or the like may be added to the annular zone 138 of the solvent dispenser 30 as needed. The solvent dispenser 30 may, of course, be positioned outside of the brine well 34 and the brine tank 28. However, to achieve sequential contacting of the resin particles with iron contaminant solvent and brine solution in accordance with the present invention the solvent dispenser 30 must be connected to the line 26 so that the contaminant solvent will reach the resin tank 16 before the brine solution. To these ends the solvent dispenser 30, in this instance, communicates with the line 26 at a point closer to the aspirator valve 20 than the point where the brine tank 26 or brine well 34 communicate with the line 26. Furthermore, the solvent dispenser 30 is above the level of the brine solution in the brine well 34 as shown in FIGURE 2. Accordingly, less driving force is required for the solvent to flow from the solvent dispenser 30 to the aspirator valve 20 through the line 26 than for the brine solution to flow from the brine well 34 to the aspirator valve 20. Therefore, the solvent will be the first to be dispensed to the aspirator valve 20 and is followed by the brine solution. In this manner, the resin particles are contacted sequentially with contaminant solvent and brine solution. Sequential contacting of the resin particles may also be obtained when the solvent dispenser 30 is below the level of the brine solution in the brine well 34 by suitable modification of the position of the line 26.

Assuming that the water softener system has been performing its service cycle and that the ion exchange resin particles have become exhausted, the regeneration cycle is initiated by the timer 46 automatically closing and energizing the circuit including the drain valve 48 and the conductors 102. Upon energizing this circuit, the valve 48 is opened causing the pressure in the conduits 76 and 78 and the chamber 72 to drop to approximately atmospheric pressure. Accordingly, the pressure of the raw iron-containing water from the line 10 entering the chambers 52 and 56 causes the diaphragm 58 to move upwardly whereby the valve member 66 moves upwardly to close the port 62 in the partition 54 and open the port 64 in the partition 58. The raw water then flows from the chamber 52 through the port 64, the outlet chamber 60 and the conduit 24 into the aspirator valve 20. A portion of the raw water passes through the injector nozzle 150 and the venturi tube 152 and into the outlet chamber 84 from which it passes through the conduit 18 into the lower portion of the resin tank 16. The passage of the raw water through the injector nozzle 150 and the venturi tube 152 arrangement creates a partial vacuum or low pressure in the chamber 86 of the aspirator valve 20. Accordingly, the line 26 is also placed under a partial vacuum or low pressure thereby actuating the solvent dispenser 30 and brine tank 28 to sequentially dispense contaminant solvent and brine solution, respectively, to the line 26.

In the solvent dispenser 30, the low pressure in the line 26 creates a pressure differential across the valve closure member 126 causing the valve stem 128 to move downwardly slightly. Contaminant solvent begins to flow from the solvent container 106 and float chamber 134 through the passageway 114, the chamber 124 and the passageway 127 into the line 26 to the aspirator valve 20. As the flow of solvent continues in this manner the float body 132 moves downwardly and allows the valve stem 128 to also move downwardly. The downward movement of the valve stem 128 terminates, however, when the flange 144 rests upon the valve seat 120 formed by the tops of the ribs 112. The flow of solvent from the solvent container 106 and the float chamber 134 continues, however, through the annular port formed by the flange 144 and the body member 110. The flow of contaminant solvent from the solvent dispenser 30 terminates when the float body 132 moves downwardly sufficiently that the valve closure member 146 engages the annular seat 116 and the flange 144 thereby closing off the annular port formed by the flange 144 and the body member 110. In this manner, the amount of solvent supplied to the line 26 during each regeneration cycle will be substantially constant, though it may be varied by changing the position of the stop member 143 on the guide rod 130, since this controls the amount of solvent prepared for each regeneration cycle.

The contaminant solvent drawn from the solvent dispenser 30 passes through the line 26 into the chamber 86 of the aspirator valve 20. From the chamber 86 the solvent passes through the venturi tube 152, the outlet chamber 84 and the conduit 18 into the bottom of the resin tank 16 along with the flowing raw water.

Similarly, brine solution is drawn from the brine well 34 and the brine tank 28 until the level of the brine solution in the brine well 34 and the brine tank 28 has reached a level whereby the float body 40 closes the valve 38. Generally speaking, for purposes of comparison, the amount of contaminant solvent employed during each regeneration cycle is in the range of about 5 to 1000 ml., while the amount of brine solution utilized will be in the range of about 0.5 to 100 gals., depending upon the amount of resin particles, the amount and impurity of the water being treated, and the like. The valves 108 and 38 may be set to give any desired amount of solvent and brine solution, respectively. The brine solution drawn from the brine well 34 and the brine tank 28 passes through the line 26 to the resin tank 16 in the same manner that the contaminant solvent passed from the solvent dispenser 30 to the resin tank 16.

Because the solvent dispenser 30 is connected to the line 26 upstream of the point where the brine well 34 is connected to the line 26 (with respect to the regeneration cycle) and because only a relatively small amount of solvent is utilized, there will be little or non co-mingling of the brine solution with the solvent. Therefore, the contaminant solvent will pass ahead of the brine solution through the line 26, the aspirator valve 20, the line 18 and the resin tank 16. The contaminant solution and brine solution pass sequentially upwardly through the resin bed 17 in the resin tank 16 and regenerate the resin particles. They are withdrawn sequentially through the conduit 14 and pass through conduit 78, flow control valve 80, line 76 and valve 48 to the drain line 32. The regeneration cycle is terminated by the timer 46 automatically breaking the circuit and thereby closing the valve 48.

When the valve 48 closes the liquid pressure in the chamber 72 will build up until the combined action of the spring 74 with the liquid pressure in the chamber 72 causes the diaphragm 68 to move downwardly until the valve member 66 opens the port 62 and closes the port 64. The water softening system is now back to its service cycle. During the regeneration cycle the other portion of the raw water which passes to the aspirator valve 20 will flow through the openings 154 in the injector nozzle 150 and the chamber 82 into the service line 22. In this manner a continuous supply of water is maintained to the service line 22. Having returned to the service cycle, the raw water passes through the chamber 52, the port 62, the outlet chamber 56 and the line 14 into the top of the resin tank 16. As the raw water passes downwardly through the bed 17 of resin particles it is softened and iron impurities also removed. The treated water is withdrawn from the bottom of the tank 16 through the line 18 and passes into the outlet chamber 84 of the aspirator valve 20. A portion of the softened water passes through the conduit 94, the check valve 92 and the conduit 90 into the service line 22. Some of the softened water passes into the chamber 86 of the aspirator valve 20 from which it flows through the line 26 to supply make-up water to the solvent dispenser 30 and the brine tank 28.

With respect to replenishing the solvent dispenser 30, the softened water under pressure passes from the line 26 through the passageway 127 into the chamber 124. Since the valve stem 128 is in its lowered position, the softened water under pressure may pass through the passageway 114, unseat the float body 132 from the flange 144 and the valve seat 116, and flow into the float chamber 134 and solvent container 106. Water continues to enter the solvent container 106 in this manner until the float body 132, which rises with the level of the liquid in the solvent container 106, comes in contact with the stop member 143. When this occurs further upward movement of the float body 132 causes corresponding upward movement of the stop member 143 and the guide rod 130. This upward movement continues until the valve closure member 126 has seated upon the valve seat 118 whereby the lower end of the passageway 114 is closed. This prevents further flow of softened water into the solvent dispenser 30. The softened water which has thus been transferred into the acid container 106 will dissolve a portion of the solid iron contaminant removal particles which have been placed in the annular chamber 138 and thereby form the iron contaminant solvent which is dispensed during the next regeneration cycle.

Similarly, softened water under pressure in the line 26 will pass through the valve 38 in the brine well 34 until the level of the liquid in the brine well 34 and the brine tank 28 closes the valve 38. The water thus introduced into the brine well 34 and the brine tank 28 will dissolve the solid salt contained in the tank 28 to form the brine solution which is subsequently utilized in the next regeneration step in the manner described hereinbefore. When the valves 108 and 38 have closed, all of the softened water from the line 18 will pass to the service line 22 in the manner described hereinbefore. When the ion exchange resin particles of the bed 17 of the resin tank 16 have become substantially exhausted, the regeneration cycle is initiated again by the timer 46.

If desired, a backwash cycle may be employed in each regeneration cycle before the resin particles have been contacted with the solvent and brine solution. To these ends the timer 46 automatically closes and energizes the circuit including the by-pass valve 50 and the conductors 100 and thereby opens the valve 50. The drain valve 48 is open simultaneously in the manner described hereinbefore. Upon opening the valve 50, a flow is established which by-passes the nozzle 150 and the venturi tube 152. The raw water flows through the chamber 52, the chamber 60 and the conduit 24, holes 154 in the nozzle 150 and the chamber 82 into the service line 22. A portion of the raw water passes to service while another portion passes through the conduit 90, the valve 92, the conduit 88, the valve 50 and the conduit 96 into the line 18. From the line 18 the raw water passes upwardly through the bed 17 of resin particles in the tank 16 and is withdrawn therefrom through the line 14. This raw water utilized for backwash passes to the drain line 32 through the conduit 78, the valve 80, the conduit 78 and the valve 48. The timer 46 subsequently closes the valve 50 whereby the resin particles are sequentially contacted with contaminant solvent and brine solution in the manner discussed hereinbefore.

Figure 6:
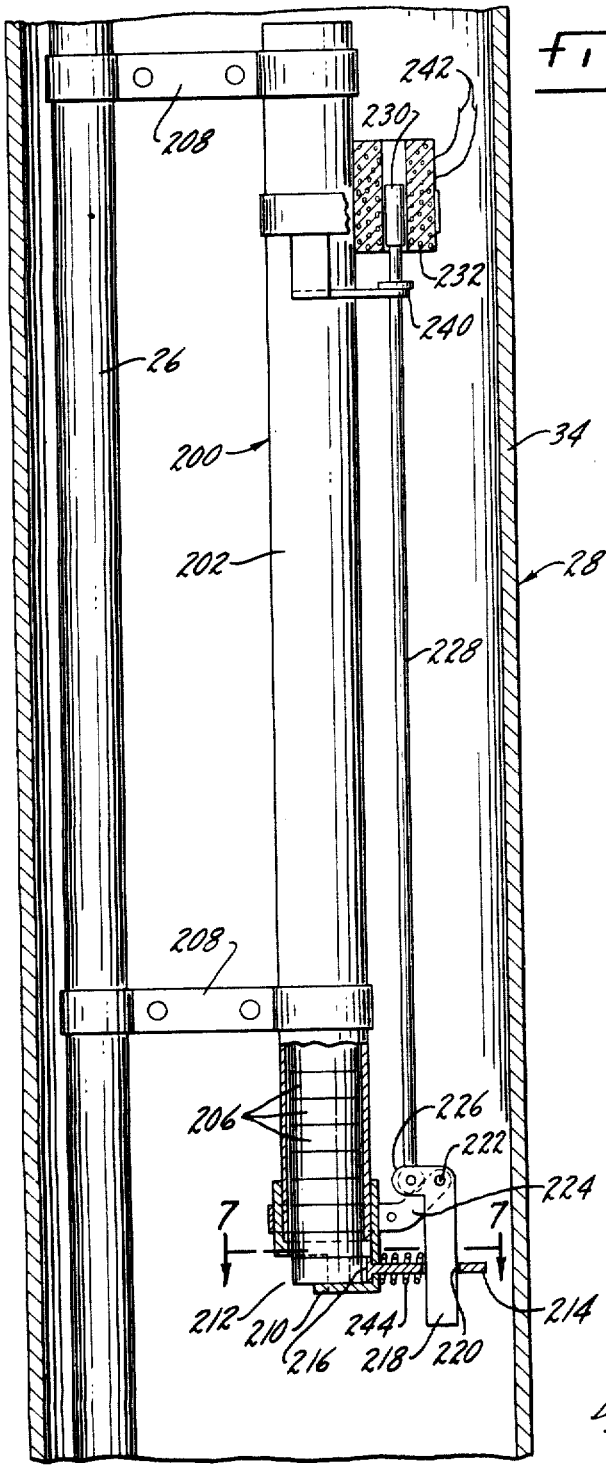
FIGURE 6 is a partially cross-sectional view of the tablet dispenser utilized in the solvent dispensing means of FIGURE 5.
Figure 7:
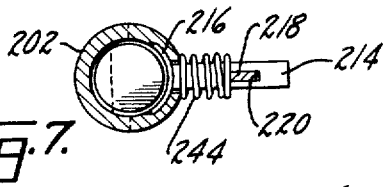
FIGURE 7 is a cross-sectional view of the tablet dispenser of FIGURE 6 taken along line 7—7 of FIGURE 6.
Figure 5:
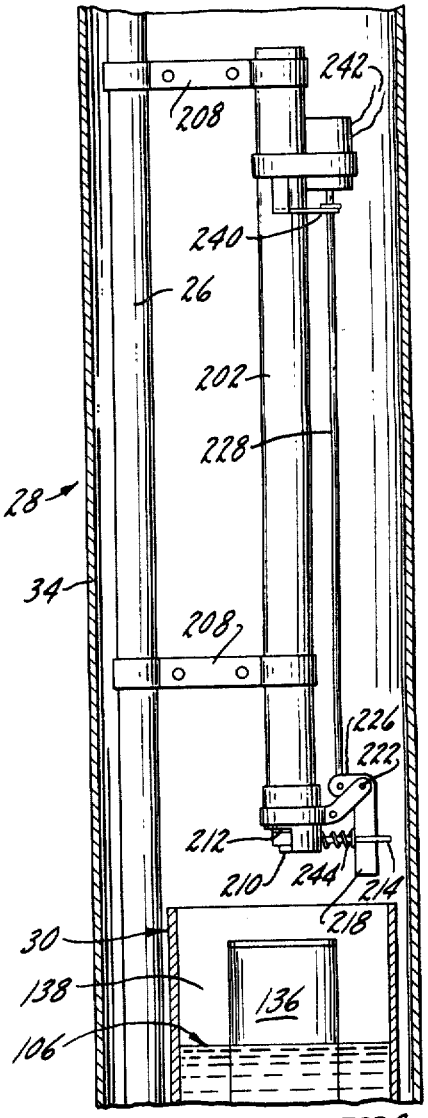
FIGURE 5 is an elevational view of a modified means for metering a pre-determined quantity of the iron contaminant solvent to the resin tank in the water softening system in accordance with the present invention.

Referring now to FIGURES 5–7 there is illustrated an embodiment of the present invention wherein a tablet dispenser, indicated generally by reference numeral 200, is utilized to discharge tablets 206 of iron contaminant removal material into the annular chamber 138 of the solvent dispenser 30 to make the iron contaminant solvent. In all other respects the water softening system in this embodiment is the same as the water softening system discussed hereinbefore with respect to FIGURES 1–4. Accordingly, the same reference numerals have been utilized in these figures to identify the same parts described hereinbefore.

In accordance with this embodiment the tablet dispenser 200 dispenses one tablet 206 of solid iron contaminant removal material into the annular chamber 138 of the solvent dispenser 30 so that a solution of contaminant solvent is made in the solvent dispenser 30 which may be utilized during the regeneration cycle. To these ends, the tablet dispenser 200 includes a vertically elongated tubular container adapted to hold a stock of individual iron removal tablets or capsules 206. Each of the tablets 206 preferably comprises a sufficient amount of water soluble iron removal material for a regeneration cycle. The container 202 is supported by brackets 208 attached to a vertically extending portion of the conduit 26 in the brine well 34 of the brine tank 28. As shown in FIGURES 5 and 6, the container 202 is mounted in the upper portion of the brine well 34 and is provided with dispensing mechanism adapted to deposit one of the tablets 206 in the annular chamber 138 of the solvent dispenser 30 for each regeneration cycle. The tablet 206 may be deposited in the solvent dispenser 30 during the service cycle, the backwash cycle, or the regeneration cycle before the dispenser 30 is actuated, as desired.

At its lower end the container 202 has a laterally projecting flange member 210 adapted to support the column of tablets 206 and a lateral opening 212 through which the tablets 206 may be discharged one at a time by a power actuated pusher mechanism. The power-actuated pusher mechanism includes a horizontally extending plunger member 214 which is movable in a slot formed in the container 202 adjacent to the flange 210. The plunger member 214 has a pusher head 216 adapted to discharge successive individual tablets 206 through the opening 212 at the bottom of the container 202. The pusher head 216 and opening 212 may be enlarged if it is desired to discharge a plurality of tablets 206 at one time. An actuating lever 218 is operatively connected to the member 214 and, as shown, extends substantially vertically through a rectangular slot 220 formed in the member 214. A fulcrum and pivotal support means 222 for the lever 218 is supported on a bracket 224 projecting laterally from the container 202. An arm portion 226 projects laterally from the lever 218 and is connected to the lower end of a link 228 extending upwardly along the container 202. The upper end of the link 228 is operatively connected to an armature plunger 230 of a solenoid having a coil 232. The upper end portion of the link 228 is movable longitudinally in a guide means 240 projecting from a bracket secured to the container 202 and having a slot fitting loosely about the link 228. Conductors 242 are provided for energizing the coil 232. The conductors 242 are in a circuit controlled by the timer 46 and arranged to be energized in timed relation to the energization of the solenoid actuated valves 48 or 50, as desired.

The tablet dispensing plunger member 214 is biased toward retracted position by a spring 244 which is confined between the outer side of the container 202 and the lever 218. When the solenoid coil 232 is energized, the plunger 230 is moved upwardly whereby the plunger member 214 moves laterally causing one of the tablets 206 to be ejected laterally from the flange 210 through the opening 212. The ejected tablet 206 falls into the annular chamber 138 of the solvent dispenser 30. As long as the solenoid 230 remains energized, the pusher member 216 is retained in its extended position wherein it prevents the descent of the other tablets 206 to the flange 210. Upon de-energization of the solenoid coil 232, the spring 244 returns the pusher 214 to its retracted position and allows another iron removal tablet to fall into position on the flange 210 so that the tablet dispenser 200 is ready for the next dispensing operation.

The solenoid 232 may be energized shortly before or simultaneously with the energization of the drain valve 48 during each cycle whether or not a backwash cycle such as described hereinbefore is used. Of course, the longer the tablet 206 is in contact with the make-up water in the dispenser 30 the more opportunity the tablet 206 has to dissolve in the make-up water. It is preferred to allow sufficient time for the tablet 206 to dissolve in the make-up water so that a controlled solvent concentration is obtained. If a saturated solvent is desired, which is preferred, the tablet 206 may be made large enough to provide a slight excess of iron contaminant removal material. A saturated solvent may also be obtained by the tablet dispenser 200 ejecting a plurality of tablets 206 into the dispenser 30 either singly or as a group before each regeneration cycle. Suitable electrical systems for actuation of the tablet dispenser 200 in any of these manners, whether controlled by the timer 46 or other suitable means, are within the ordinary skill of one in the art and do not constitute a part of the present invention. Accordingly, examples of the myriad of such suitable electrical systems that may be employed to actuate the tablet dispenser 200 at a predetermined time during each complete cycle need not be discussed herein.

Suitable solid iron contaminant removal materials for use in the present invention include citric, ammoniated citric, tartaric, sulfamic, sulfosalicylic, malic, maleic, succinic and itaconic acids and sodium hydrosulfite. The preferred iron solvents are made from the above-mentioned water-soluble acids, the most preferred acid iron solvent being an aqueous solution of citric acid. However, any material which forms an aqueous solution that will dissolve iron, without being detrimental to the equipment and resin particles, may be employed.

In accordance with the present invention the ion exchange resin particles are treated with the iron contaminant solvent prior to their being treated with the brine solution or other regenerating liquid. The effectiveness of the iron contaminant solvent is thereby greatly increased as compared with treating the ion exchange resin particles with a mixed solution of salt and the soluble iron contaminant removal material as the resin particles are contacted with a more concentrated contaminant solvent than is possible with a mixed solution of contaminant removal material and salt.

Preferably, the contaminant solvent is a saturated solution. In the modification of the invention shown in FIGURES 1–4, an excess supply of the iron contaminant removal material, preferably in granular form, is retained in the container 106 so that the solvent withdrawn from the dispenser 30 is a saturated solution. There is, of course, some dilution of the saturated solvent in the aspirator valve 20, but the solvent as it passes through the resin bed, is much more concentrated than it would be if it were mixed with the brine solution in the brine tank 28. Likewise, in the modification of the invention shown in FIGURES 5–7, the solvent which is drawn into the conduit 26 is preferably saturated and passes through the bed of resins in the tank 16 prior to the brine solution. Occluding coatings of iron oxides and organic contaminants on the ion exchange resin particles are thereby dissolved and removed by the solvent before the brine solution comes in contact with the resin particles. This makes the regeneration process more efficient and results in greater salt economy than is possible by the simultaneous treatment with a mixed solution of brine and iron contaminant removal material. In the latter treatment the salt cannot be fully effective until near the end of the regenerating cycle when the ion exchange resin particles have been freed of their occluding coatings by the iron contaminant removal material.

A further advantage of the present invention is that it prevents the bed of resin particles from being left in an acid state. When employing a solution of salt and acid iron removal material to regenerate a bed of resin particles at least a portion of the resin particles are left in the hydrogen form. These hydrogen ions will be released during the service cycle thereby increasing the acidity of the water. In the present invention the brine solution follows the solvent and therefore the bed will be converted to the sodium from before the service cycle is initiated again.

In addition, prolonged contact of the salt and iron removal material in solution produces deleterious effects on the regeneration capacity of the solution. As water softening systems, particularly those used in homes, may be regenerated only once every day or two days, the mixed regeneration solution will lose regeneration capacity before it is utilized. This problem is, of course, obviated by the present sequential system, and, accordingly, it is preferred to employ the present invention on home water softening systems wherein regeneration is effected once a day or less frequently.

This problem may also be avoided by utilizing the apparatus of the present invention and allowing the brine solution and solvent to mix in the line 26 and the aspirator valve 20 just prior to their being passed through the resin bed. This may be effected by changing the level of the solvent dispenser 30 and the point that it communicates with the line 26 so that the brine solution and solvent are drawn from the brine tank 28 and solvent dispenser 30, respectively, at the same time. In this arrangement, by virtue of the fact that the volume of solvent is very small compared to the volume of the brine solution, the latter part of the regeneration cycle will be effected solely by brine solution and the bed will be converted to the sodium form before the service cycle is initiated again.

The water softening system may be semi-automatic as well as of the automatic type. In conventional water softeners of the semi-automatic type having siphon briners, the regenerating operation is initiated manually and the duration of the subsequent regenerating and/or backwashing and return of the apparatus to the softening cycle is under control of an electric motor or spring operated timers. As the present invention provides for introducing a concentrated solvent directly into the brine draw line existing installations may be readily converted to the system of the present invention without excessive conversion expenditures. For installations where treatment for iron and organic deposits is required less frequently than the regeneration with brine solution, a manual control may be provided whereby the solvent treatment apparatus may be rendered inoperative except when required. For example, a manually operable valve may be interposed in the branch 128 of the conduit 26.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

[1. A regenerant supply system for water softeners of the type having an aspirator valve, a brine reservoir tank and a softener tank containing ion exchange resin particles comprising:

(a) a conduit connecting said aspirator valve to said reservoir tank, (b) means for storing a measured quantity of solvent for contaminating deposits on said resin particles, said storing means being connected to said conduit to supply said solvent thereto, (c) means for limiting to a predetermined quantity the solvent injected into the softener tank during each regenerating treatment, and (d) means for activating said aspirator valve to discharge a measured quantity of said solvent from said storing means into and through the resin in said softener tank, followed by a measured quantity of brine from said reservoir tank.]

[2. A regenerant supply system in accordance with claim 1 in which said storing means is charged with a water soluble contaminant removal material in solid form and water is supplied from said conduit for forming a saturated contaminant solvent in said storing means and means in said storing means for measuring the quantity of said solvent which is withdrawn through said conduit for each regenerating operation.]

3. A regenerant supply system in accordance with claim [1] *22* including dispensing means for depositing a measured quantity of solid, water soluble contaminant removal material in water in said [storing] *first storage* means, and means for energizing said dispensing means for depositing a measured quantity of contaminant removal material in the water in said [storing] *first storage* means for each regenerating operation.

4. A regenerant supply system in accordance with claim 3 in which said dispensing means comprises a magazine containing a stack of the solid contaminant removal material in the form of tablets each comprising a predetermined quantity of contaminant removal material.

5. A regenerant supply system for water softeners of the type having a softener tank containing ion exchange resin particles and a brine reservoir tank comprising:

(a) aspirator means for periodically injecting brine from said reservoir tank into said resin tank including a *first* conduit *connecting said aspirator valve to said reservoir tank and* disposed to withdraw brine from said reservoir tank *and a second conduit means connecting said aspirator valve to said resin tank,*

(b) float valve means in said brine tank for limiting to a predetermined quantity the brine injected into the softener tank during each regenerating treatment, (c) means for storing a measured quantity of contaminant solvent connected to said conduit, (d) valve means disposed to control the flow of said solvent from said storing means through said conduit into the softener tank, (e) a timer for activating said aspirator means for a predetermined period of time for each regenerating treatment, (f) a magazine containing a stack of solid, water-soluble contaminant removal material tablets, each comprising a predetermined quantity of contaminant removal material, said magazine being disposed to deposit the tablets in a measured quantity of water in said storing means and thereby form contaminant solvent, and means under control of said timer for discharging tablets successively from said magazine in said storing means *for each regenerating treatment.*

[6. A method of regenerating a substantially exhausted bed of water softening ion exchange particles having an occluding coating of contaminating material which comprises, flowing water through said bed, introducing into the water flowing through said bed a saturated solution of a solid acid solvent for said coating, and then flowing through said bed a solution of sodium chloride.]

[7. A method of regenerating a bed of water softening ion exchange particles in accordance with claim 6 in which said solid acid solvent is selected from the group consisting of citric, tartaric, sulfamic, sulfosalicylic, malic, maleic, succinic and itaconic acids.]

[8. In a water softening process in which a bed of ion exchange particles is regenerated by continuously flowing a liquid stream therethrough, an improvement in the regeneration cycle that removes iron that fouls said particles, comprising the steps of periodically injecting an acid iron solvent into said continuously flowing liquid stream, and immediately thereafter injecting a brine solution into said continuously flowing liquid stream.]

[9. In a water softening process in which a bed of ion exchange particles is periodically regenerated by flowing a brine solution therethrough, an improvement in the regeneration cycle that removes iron that fouls said particles, comprising, the steps of periodically injecting an acid iron solvent into said bed prior to flow of said brine solution, and immediately thereafter flowing said brine solution through said bed.]

[10. A regenerant supply system for a bed of ion exchange resin particles which have become contaminated by contact with an iron-containing water, which system comprises means for sequentially injecting into said bed of ion exchange resin particles an acid iron solvent and subsequently a brine solution, said means for sequentially injecting said solutions communicating with first storage means for said acid iron solvent and second storage means for said brine solution.]

[11. In a water softening process in which a bed of ion exchange resin particles is regenerated by continuously flowing a liquid stream therethrough, an improvement in the regeneration cycle that removes iron that fouls said particles, comprising the steps of periodically injecting an iron contaminant solvent into said continuously flowing liquid stream, and immediately thereafter injecting a brine solution into said continuously flowing liquid stream.]

[12. In a water softening process in which a bed of ion exchange resin particles is periodically regenerated by flowing a brine solution therethrough, an improvement in the regeneration cycle that removes iron that fouls said particles, comprising the steps of periodically injecting an iron contaminant solvent into said bed prior to flow of said brine solution, and immediately thereafter flowing said brine solution through said bed.]

[13. A method of regenerating a bed of ion exchange resin particles which has become substantially exhausted by contact with iron-containing water comprising sequentially contacting said resin particles in said bed with an iron contaminant solvent and a brine solution.]

[14. The method of claim 13 wherein said iron contaminant solvent is an aqueous solution of citric acid.]

[15. In a home water softening system for softening iron-containing water in which a bed of ion exchange particles is regenerated once a day, or less frequently, by continuously flowing a liquid stream therethrough, an improvement in the regeneration cycle comprising the steps of storing a brine solution and an iron contaminant solvent separately, injecting brine solution and contaminant solvent into said continuously flowing liquid stream, and injecting further brine solution into said flowing liquid stream after said contaminant solvent is exhausted.]

[16. In a home water softening system for softening iron-containing water in which a bed of ion exchange particles is regenerated once a day, or less frequently, an improvement in the regeneration cycle comprising storing an iron contaminant solvent and brine solution separately, and sequentially contacting said bed with solvent and brine solution, respectively.]

*17. A regenerant supply system for water softeners of the type having an aspirator valve, a brine reservoir and a resin tank containing ion exchange resin particles comprising:*

*(a) a valveless conduit connecting said aspirator valve to said reservoir;*

*(b) means for storing a measured quantity of liquid solvent for contaminating deposits on said resin particles, said means for storing said solvent being connected through valveless means to said conduit to supply said solvent thereto;*

*(c) means for limiting to a predetermined quantity the liquid solvent injected into the resin tank during each regenerating treatment;*

*(d) conduit means connecting said aspirator valve to said resin tank and coacting with means for activating said aspirator valve to discharge a measured quantity of said solvent from said container into and through the resin in said softener tank, followed by a measured quantity of brine from said reservoir; and*

*(e) said means for storing a measured quantity of solvent being higher than said brine in said reservoir* and communicating with said conduit at an elevation higher than said brine in said reservoir.

18. A regenerant supply system in acordance with claim 17 in which said means for activating said aspirator valve includes a timer for periodically and automatically activating the same.

19. A regenerant supply system in accordance with claim 17 including a float valve responsive to changes in the elevation of said solvent in said solvent storing means for measuring the quantity of said solvent which is discharged into said conduit.

20. A regenerant supply system in accordance with claim 17 including means for measuring the quantity of solvent withdrawn from said solvent storing means, said means for measuring the quantity of solvent including a float valve responsive to changes in the level of solvent in said solvent storing means and disposed to control the flow to and from said solvent storing means.

21. A regenerant supply system for water softeners of the type having a resin tank containing ion exchange resin particles and a brine reservoir comprising:

(a) aspirator means for periodically injecting brine from said reservoir into said tank including a first valveless conduit connecting said aspirator valve to said reservoir tank and a second conduit connecting said aspirator valve to said resin tank;

(b) float valve means in said brine tank for limiting to a predetermined quantity the brine injected into the resin tank during each regenerating treatment;

(c) means for storing a measured quantity of an iron contaminant solvent, said solvent storing means communicating through valveless means with said first conduit, said solvent storing means being higher than said brine in said brine reservoir and communicating with said first conduit at an elevation higher than said brine in said reservoir;

(d) valve means controlling the flow of said solvent and from said solvent storing means to said resin tank; and (e) a timer for activating said aspirator valve for a predetermined period of time for each regenerating treatment.

22. A regenerant supply system for a bed of ion exchange resin particles which have become contaminated, which system comprises a first storage means for a contaminant solvent, a second storage means for a brine solution, suction means communicating with said bed of ion exchange resin particles for withdrawing said solvent and said solution from said first and second storage tanks and injecting said solvent and said solution into said bed of ion exchange resin particles, respectively, valveless pipe means connecting said second storage means and said suction means, said first storage means being higher than said brine solution and communicating through valveless means with said pipe means at an elevation higher than said brine solution.

23. A regenerant supply system for a bed of ion exchange resin particles which have become contaminated by contact with iron-bearing water, which system comprises a first storage means for an iron contaminant solvent, a second storage means for a brine solution, aspiration means communicating with said bed of ion exchange resin particles for withdrawing said solvent and said solution from said first and second storage tanks and injecting said solvent and said solution into said bed of ion exchange resin particles, valveless pipe means connecting said first storage means and said second storage means to said aspiration means, said first storage means being higher than said brine solution and communicating through valveless means with said pipe means at an elevation higher than said brine solution.

24. The regenerant supply system of claim 23 wherein said first storage means includes means for dispensing a predetermined amount of solvent to said aspiration means.

25. The regenerant supply system of claim 23 wherein said first storage means includes a solvent dispenser means and a tablet dispenser means, said solvent dispenser means having valving means for permitting said solvent dispenser means to receive and discharge a predetermined amount of liquid, and said tablet dispensing means being adapted to deposit in said solvent dispenser means a tablet of water-soluble iron removal material.

26. The regenerant supply system of claim 25 wherein said tablet dispensing means includes a magazine means for holding a stack of said tablets and means for successively discharging tablets from said magazine into said solvent dispensing means.

27. A regenerant supply system for water softeners of the type having an aspirator valve, a brine tank and a resin tank containing ion exchange resin particles comprising a valveless first conduit connecting said aspirator valve to said brine tank, a second conduit connecting said aspirator valve and said resin tank, a solvent dispenser communicating through valveless means with said first conduit, means for activating said aspirator valve so that solvent and brine are drawn from said solvent dispenser and brine tank, respectively, said solvent dispenser being higher than said brine and communicating with said first conduit at an elevation higher than said brine.

28. The regenerant supply system of claim 27 wherein said solvent dispenser includes means to dispense a predetermined amount of solvent during the regeneration cycle and said brine tank includes means to dispense a predetermined amount of brine during the regeneration cycle.

29. A water softening and regenerant supply system comprising a resin tank containing ion exchange resin particles; aspirator means communicating with a lower portion of said resin tank; a valve means communicating with an upper portion of said resin tank, a source of water to be softened, and said aspirator means; said valve means directing said water to the upper portion of said resin tank during the service cycle and through said aspirator valve to the lower portion of said resin tank during a regeneration cycle; a first storage means for an iron contaminant solvent; a second storage means for a brine solution; first valveless conduit means connecting said aspirator means to said second storage means; second valveless conduit means connecting said first storage means to said first conduit; said first storage means being higher than said brine solution in said second storage means; said second conduit communicating with said first conduit at an elevation higher than said brine solution in said second storage means; said first storage means including a solvent dispenser means and a tablet dispenser means, said solvent dispenser means having valving means for permitting said solvent dispenser means to receive and dispense a predetermined amount of liquid, and said tablet dispenser means being adapted to deposit in said solvent dispenser means a tablet of water-soluble iron removal material.

30. The water softening and regenerant supply system of claim 29 wherein said second storage means includes means to dispense a predetermined amount of brine during the regeneration cycle.

31. A regenerant supply system for a bed of ion exchange resin particles which have become contaminated, which system comprises a first storage means for a contaminant solvent, a second storage means for a brine solution, valveless conduit means connecting said first storage means to an aspiration means, valveless conduit means connecting said second storage means to said aspiration means, said aspiration means communicating with said bed of ion exchange resin particles and withdrawing said solvent and said solution from said first and second storage tanks and injecting said solvent and said solution into said bed of ion exchange resin particles, respectively, said first and second storage means being positioned with respect to one another such that the pressure required to draw solvent from said first storage means to said aspira-

*tion means is less than the pressure required to draw brine solution from said second storage means to said aspiration means.*

*32. The regenerant supply system of claim 31 wherein said first storage means includes means for dispensing a predetermined amount of solvent to said aspiration means and said second storage means includes means for dispensing a predetermined amount of brine solution to said aspiration means.*

*33. The regenerant supply system of claim 32 wherein said means for dispensing a predetermined amount of solvent to said aspiration means includes a valve means for permitting said first storage means to receive and discharge a predetermined amount of liquid and tablet dispenser means adapted to deposit in said first storage means a tablet of water-soluble iron removal material.*

*34. A method of regenerating a bed of ion exchange resin particles which have become contaminated, which comprises storing a contaminant solvent in a first storage means, storing a brine solution in a second storage means, withdrawing solvent and brine solution from said first and second storage means by aspirator means communicating with said bed of ion exchange resin particles and sequentially injecting said solvent and said solution into said bed of ion exchange resin particles, connecting said second storage means and said aspirator means through first valveless pipe means, said first storage means being higher than said brine solution and communicating through second valveless pipe means with said first pipe means at an elevation higher than said brine solution.*

*35. A method of regenerating a bed of ion exchange resin particles which have become contaminated, which comprises storing a contaminant solvent in a first storage means, connecting said first storage means to an aspiration means through first valveless conduit means, storing a brine solution in a second storage means, connecting said second storage means to said aspiration means through second valveless conduit means, said aspiration means communicating with said bed of ion exchange resin particles, withdrawing solvent and brine solution from said first and second storage means by said aspiration means and sequentially injecting said solvent and said solution into said bed of ion exchange resin particles, said first and second storage means being positioned with respect to one another such that the pressure required to draw solvent from said first storage means to said aspiration means is less than the pressure required to draw brine solution from said second storage means to said aspiration means.*

References Cited

The following references, cited by the Examiner, are of record in the patented file of this patent or the original patent.

UNITED STATES PATENTS

| | | | |
|---|---|---|---|
| 2,995,522 | 8/1961 | Joyce | 252—105 |
| 3,032,395 | 4/1962 | Bowman | 23—112 |
| 3,073,674 | 1/1963 | Rudelick | 23—112 |
| 3,078,224 | 2/1963 | Schulze et al. | 210—30 |
| 3,116,240 | 12/1963 | Downer et al. | 210—30 X |
| 3,139,401 | 6/1964 | Hach | 210—30 |
| 3,154,484 | 10/1964 | Stoner | 210—35 |
| 1,719,826 | 7/1929 | Aldrich | 221—274 X |
| 2,304,661 | 12/1942 | Shoemaker | 210—191 X |
| 2,558,522 | 6/1951 | Knapp | 221—96 X |
| 2,855,944 | 10/1958 | Albin | 210—191 X |
| 3,073,674 | 1/1963 | Rudelick | 210—191 X |
| 3,090,521 | 5/1963 | Fazekas | 221—274 X |
| 3,094,134 | 6/1963 | Currie | 23—267 X |
| 3,095,005 | 6/1963 | Thompson | 210—191 X |
| 3,107,156 | 10/1963 | Fredericks | 23—267 |
| 3,216,931 | 11/1965 | Dennis et al. | 210—191 X |

REUBEN FRIEDMAN, *Primary Examiner.*

C. DITLOW, *Assistant Examiner.*